(12) United States Patent
Kim et al.

(10) Patent No.: US 11,532,967 B2
(45) Date of Patent: Dec. 20, 2022

(54) ELECTRIC MOTOR HAVING PERMANENT MAGNET AND COMPRESSOR INCLUDING AN ELECTRIC MOTOR

(71) Applicant: LG ELECTRONICS INC., Seoul (KR)

(72) Inventors: Kiman Kim, Seoul (KR); Sangjoon Eum, Seoul (KR); Dongseok Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 588 days.

(21) Appl. No.: 16/492,213

(22) PCT Filed: Feb. 27, 2018

(86) PCT No.: PCT/KR2018/002391
§ 371 (c)(1),
(2) Date: Sep. 9, 2019

(87) PCT Pub. No.: WO2018/169232
PCT Pub. Date: Sep. 20, 2018

(65) Prior Publication Data
US 2020/0007004 A1     Jan. 2, 2020

(30) Foreign Application Priority Data

Mar. 16, 2017   (KR) .................. 10-2017-0033334

(51) Int. Cl.
*H02K 5/24*      (2006.01)
*F25B 1/04*      (2006.01)
(Continued)

(52) U.S. Cl.
CPC .............. *H02K 5/24* (2013.01); *F25B 1/04* (2013.01); *H02K 1/278* (2013.01); *H02K 1/30* (2013.01); *H02K 21/14* (2013.01)

(58) Field of Classification Search
CPC ............ H02K 5/24; H02K 1/278; H02K 1/30; H02K 21/14; H02K 1/2733; H02K 1/2746;
(Continued)

(56) References Cited

U.S. PATENT DOCUMENTS 4,617,484 A * 10/1986 Buijsen ................ H02K 1/2786
  310/67 R
5,898,990 A *  5/1999 Henry .................... H02K 15/03
  29/598

(Continued)

FOREIGN PATENT DOCUMENTS

DE    10 2011 079 224    12/2012
EP         1 795 701       6/2007
(Continued)

OTHER PUBLICATIONS

See attached translated version of foreign patent KR20040094156 A. (Year: 2004).*

(Continued)

*Primary Examiner* — Emily P Pham
*Assistant Examiner* — Htet Z Kyaw
(74) *Attorney, Agent, or Firm* — KED & Associates, LLP

(57) ABSTRACT

An electric motor having a permanent magnet and a compressor including an electric motor are provided. The electric motor may include a stator; and a rotor rotatably disposed and spaced a predetermined gap apart from the stator. The rotor may include a rotational shaft, a permanent magnet arranged concentrically to the rotational shaft, and a permanent magnet support that supports the permanent magnet. The permanent magnet may have a cylindrical shape and be magnetized to have polar anisotropy such that a magnetic field is formed on the magnet's surface facing the gap but is not formed on the magnet's surface opposite to the (Continued)

gap. The permanent magnet support may be configured to form no flux path in the permanent magnet and connect the rotational shaft to the permanent magnet. Thus, the rotor has a reduced weight with consequent suppression of vibration and noise.

19 Claims, 14 Drawing Sheets

(51) Int. Cl.
    *H02K 1/278*     (2022.01)
    *H02K 1/30*     (2006.01)
    *H02K 21/14*     (2006.01)

(58) Field of Classification Search
    CPC ... H02K 2201/03; F25B 1/04; F04C 2240/40; F04C 2240/60; F04C 23/008; F04C 18/356; F04C 29/0085; F04B 35/04; F04B 35/06; H01F 7/0221; H01F 7/02; H01F 41/0253
    See application file for complete search history.

(56) References Cited

U.S. PATENT DOCUMENTS

| | | | | |
|---|---|---|---|---|
| 6,765,319 | B1 * | 7/2004 | Thompson | H01F 1/0578 310/43 |
| 8,876,494 | B2 * | 11/2014 | Lee | F04C 18/348 418/64 |
| 9,787,150 | B2 * | 10/2017 | Hidaka | H02K 1/28 |
| 10,958,139 | B2 * | 3/2021 | Takahashi | H02K 7/003 |
| 2004/0045154 | A1 * | 3/2004 | Kojima | H02K 1/30 29/598 |
| 2007/0052310 | A1 * | 3/2007 | Sakai | F04D 13/064 310/43 |
| 2008/0012434 | A1 | 1/2008 | Jiang et al. | |
| 2010/0066189 | A1 * | 3/2010 | Horng | H02K 1/2733 310/156.09 |
| 2010/0225192 | A1 * | 9/2010 | Jeung | H02K 1/30 310/156.43 |
| 2011/0273037 | A1 * | 11/2011 | Ota | H02K 1/30 310/156.14 |
| 2012/0128516 | A1 * | 5/2012 | Lee | F04C 18/3564 417/423.13 |
| 2014/0001890 | A1 * | 1/2014 | Ota | H02K 1/2733 310/43 |
| 2015/0086398 | A1 | 3/2015 | Teufl et al. | |

FOREIGN PATENT DOCUMENTS

| | | |
|---|---|---|
| EP | 2 852 031 | 3/2015 |
| GB | 2 007 146 | 5/1979 |
| JP | S59-152961 | 10/1984 |
| JP | 8-65932 | 3/1996 |
| JP | 2001-178040 | 6/2001 |
| JP | 2014-202070 | 10/2014 |
| KR | 0137417 | 2/1998 |
| KR | 20-1999-013754 | 4/1999 |
| KR | 10-2004-0065530 | 7/2004 |
| KR | 10-2004-0094156 | 11/2004 |
| KR | 10-0567130 | 3/2006 |
| KR | 10-0727028 | 6/2007 |
| KR | 10-0820176 | 4/2008 |
| KR | 10-2017-0033334 | 3/2017 |

OTHER PUBLICATIONS

Received STIC search report from EIC 2800 searcher Steve Chung, Chickasaw for claim 15 on Mar. 31, 2022. (Year: 2022).*
Received STIC search report from EIC 2800 searcher Michael Giles for claim 1 on Mar. 28, 2022. (Year: 2022).*
International Search Report (with English Translation) and Written Opinion dated Jun. 21, 2018 issued in Application No. PCT/KR2018/002391.
Korean Office Action dated Jun. 27, 2018.
Korean Notice of Allowance dated Nov. 18, 2018.
European Search Report dated Dec. 9, 2020 issued in EP Application No. 18766738.1.
European Office Action dated Oct. 27, 2022 issued in EP Application No. 18766738.1.

* cited by examiner

ELECTRIC MOTOR HAVING PERMANENT MAGNET AND COMPRESSOR INCLUDING AN ELECTRIC MOTOR

This application is a U.S. National Stage Application under 35 U.S.C. § 371 of PCT Application No. PCT/KR2018/002391, filed Feb. 27, 2018, which claims priority to Korean Patent Application No. 10-2017-0033334, filed Mar. 16, 2017, whose entire disclosures are hereby incorporated by reference.

BACKGROUND

1. Field

An electric motor having a permanent magnet and a compressor having an electric motor are disclosed herein.

2. Background

As is well known, an electric motor is an apparatus that converts electric energy into mechanical energy. Electric motors are classified into a direct current (DC) type, a single phase alternating current (AC) type, and a three-phase AC type depending on an electric power (or power) supply system.

Such an electric motor generally includes a stator, and a rotor disposed to be movable relative to the stator with a predetermined gap therebetween. A part of the rotor includes a rotor core having a rotational shaft, a plurality of conductor bars inserted into the rotor core in an axial direction, and an end ring shorting the conductor bars. Another part of the rotor includes a permanent magnet, and a rotor frame provided with a rotational shaft to support the permanent magnet.

However, in the related art electric motor having the permanent magnet, a magnetic body (a back yoke) is provided at the rear of the permanent magnet to form a flux path, which causes an increase in a mass of the rotor. Vibration and noise may be increased when the mass of the rotor is increased.

Further, when the mass of the rotor is increased, the inertia of the rotor is increased, which may make it difficult to start and stop the rotor. In addition, the magnetic body is formed of a high-priced magnetic steel sheet (or electromagnetic steel sheet or silicon steel sheet) having a high magnetic property, which may cause an increase in manufacturing costs.

On the other hand, a compressor includes a case, a compression unit provided inside of the case to compress a refrigerant, and an electric motor provided inside of the case to supply a drive force to the compression unit. The compression unit includes a cylinder, and a roller provided inside of the cylinder and connected to the rotational shaft of the electric motor to be rollable.

The electric motor includes a stator fixed to the inside of the case, and a rotor rotatably disposed in the stator around the rotational shaft. Bearings are provided on both sides of the cylinder along the axial direction of the cylinder so as to rotatably support the rotational shaft protruding at the both sides of the cylinder.

However, in the related art compressor, the rotor is provided with a rotor core made of a magnetic material and a permanent magnet coupled to the rotor core. This causes an increase in the mass of the rotor which results in increasing vibration and noise. Particularly, as one side of the rotor is supported by the bearings extending along the axial direction of the rotational shaft, abrasion of the bearings is greatly increased when the mass and the vibration are increased.

Therefore, embodiments disclosed herein are directed to providing an electric motor having a permanent magnet capable of reducing mass of a rotor and suppressing vibration and noise occurrence and/or a compressor including the same. In addition, embodiments disclosed herein are directed to providing an electric motor having a permanent magnet capable of easily changing a material, a shape and a size of a rotor frame supporting the permanent magnet and/or a compressor including the same.

Further, embodiments disclosed herein are directed to providing an electric motor having a permanent magnet capable of reducing mass of a rotor and easily manufacturing a rotor and/or a compressor including the same. Furthermore, embodiments disclosed herein are directed to providing an electric motor having a permanent magnet capable of suppressing vibration of a rotor to reduce wear of a bearing.

In order to achieve the objects as described above, embodiments disclosed herein provide an electric motor having a permanent magnet including a stator; and a rotor rotatably disposed and spaced a predetermined gap apart from the stator. The rotor may include a rotational shaft; a permanent magnet disposed concentrically with the rotating shaft; and a permanent magnet support means or support that supports the permanent magnet. The permanent magnet may have a cylindrical shape and be magnetized in polar anisotropy such that a magnetic field is formed on a surface of the permanent magnet facing the gap and a magnetic field is not formed on a surface of the permanent magnet opposite to the gap. Accordingly, as the permanent magnet support means does not have to form a flux path, the design of the permanent magnet support means may be free.

According to one embodiment, the permanent magnet support means may include a rotor frame provided between the rotational shaft and the permanent magnet. The permanent magnet may have a cylindrical shape, and the rotor frame does not form a flux path of the permanent magnet, and is formed so as to connect the rotational shaft and the permanent magnet.

According to one embodiment, the rotational shaft and the rotor frame are formed of different materials, respectively. According to one embodiment, the rotor frame is configured to be injection-molded around the rotational shaft.

According to one embodiment, the rotational shaft is configured to have a protrusion protruding outwardly or a groove recessed inwardly along a radial direction from an outer surface, and the rotor frame is configured to have an engaging portion engaging with the protrusion or the groove along a rotational direction. According to one embodiment, the protrusion or the groove is formed to be spaced apart along an axial direction, and the rotor frame is configured to be injection-molded at an outer surface of the protrusion or the groove.

According to one embodiment, the rotational shaft and the rotor frame are configured to be formed of the same material. According to one embodiment, the rotational shaft and the rotor frame are formed of the same material, and the rotor frame is formed integrally so as to protrude from the outer surface of the rotational shaft along the radial direction.

According to one embodiment, the rotor frame includes a hub provided with the rotational shaft therein, a cylindrical part or portion disposed concentrically with the hub at an outer side of the hub, and a connecting part or portion connecting the hub and the cylindrical part.

According to one embodiment, the permanent magnet is a sintered magnet, and an adhesive layer is provided between the permanent magnet and the rotor frame. According to one embodiment, the rotor frame is formed to have a reduced length as compared with the permanent magnet along the axial direction.

According to one embodiment, the permanent magnet is a bonded magnet, and the permanent magnet is configured to be injection-molded at an outer surface of the rotor frame.

According to another embodiment, a compressor may include a case; a compression unit provided inside of the case to compress fluid; and an electric motor provided inside of the case and having the permanent magnet providing driving force to the compression unit. According to one embodiment, the compression unit may include a cylinder forming a compression space; a roller connected to a rotational shaft of the electric motor having the permanent magnet and rotated inside of the cylinder; and a bearing provided at the cylinder to rotatably support the rotational shaft.

According to one embodiment, the rotational shaft includes a first shaft portion coupled to a rotor frame and a second shaft portion coupled to the roller. The first shaft portion and the second shaft portion may be configured to be coupled integrally to each other after the rotor frame and the roller are coupled.

As described above, according to one embodiment, a permanent magnet is magnetized in polar anisotropy such that a magnetic field is formed on a surface of the permanent magnet facing a gap and a magnetic field is not formed on a surface of the permanent magnet opposite to the gap, and a permanent magnet support means (rotor frame) does not form a flux path of the permanent magnet and is formed to connect the rotational shaft and the permanent magnet, and thus, mass of a rotor may be reduced, and vibration and noise occurrence of the rotor may be suppressed.

Further, as the rotor frame supporting the permanent magnet may be formed independently of the formation of the flux path of the permanent magnet, a material, a shape, and a size of the rotor frame may be changed easily. Accordingly, not only the mass of the rotor may be reduced but also the rotor may be manufactured easily.

Further, as the rotor frame does not form the flux path, it may be formed integrally with the rotational shaft with the same material as that of the rotational shaft, thereby easily manufacturing the rotor. Furthermore, as the rotor frame does not form the flux path, the rotor frame is formed with a plastic which is a non-magnetic material and has a small gravity, thereby reducing the mass of the rotor.

In addition, as the rotor frame does not form the flux path, the rotor frame is injection-molded integrally at an outer surface of the rotational shaft, thereby easily manufacturing the rotor. Further, the rotor frame is injection-molded around the rotational shaft, and the permanent magnet is injection-molded around the rotor frame, thereby reducing the mass of the rotor and easily manufacturing the rotor.

Furthermore, the mass of the rotor is reduced and generation of vibration is suppressed, and thus, a compression unit is connected to one end portion of the rotational shaft of the rotor, and wear of a bearing provided between the rotor and the compression unit may be reduced remarkably. In addition, as the rotor frame is formed to be shortened in an axial direction as compared with the permanent magnet, and a bearing insert portion for inserting the bearing inside the rotor is not formed separately, the rotor may be easily manufactured.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments disclosed in this specification will be described in detail with reference to the accompanying drawings. In this specification, the same or equivalent components may be provided with the same or similar reference numbers even in different embodiments, and description thereof will not be repeated. A singular representation may include a plural representation unless it represents a definitely different meaning from the context. In describing the present invention, if a detailed explanation for a related known technology or construction is considered to unnecessarily divert the gist of the present disclosure, such explanation has been omitted but would be understood by those skilled in the art. It should be noted that the attached drawings are provided to facilitate understanding of the embodiments disclosed in this specification, and should not be construed as limiting the technical idea disclosed in this specification by the attached drawings.

Figure 1:
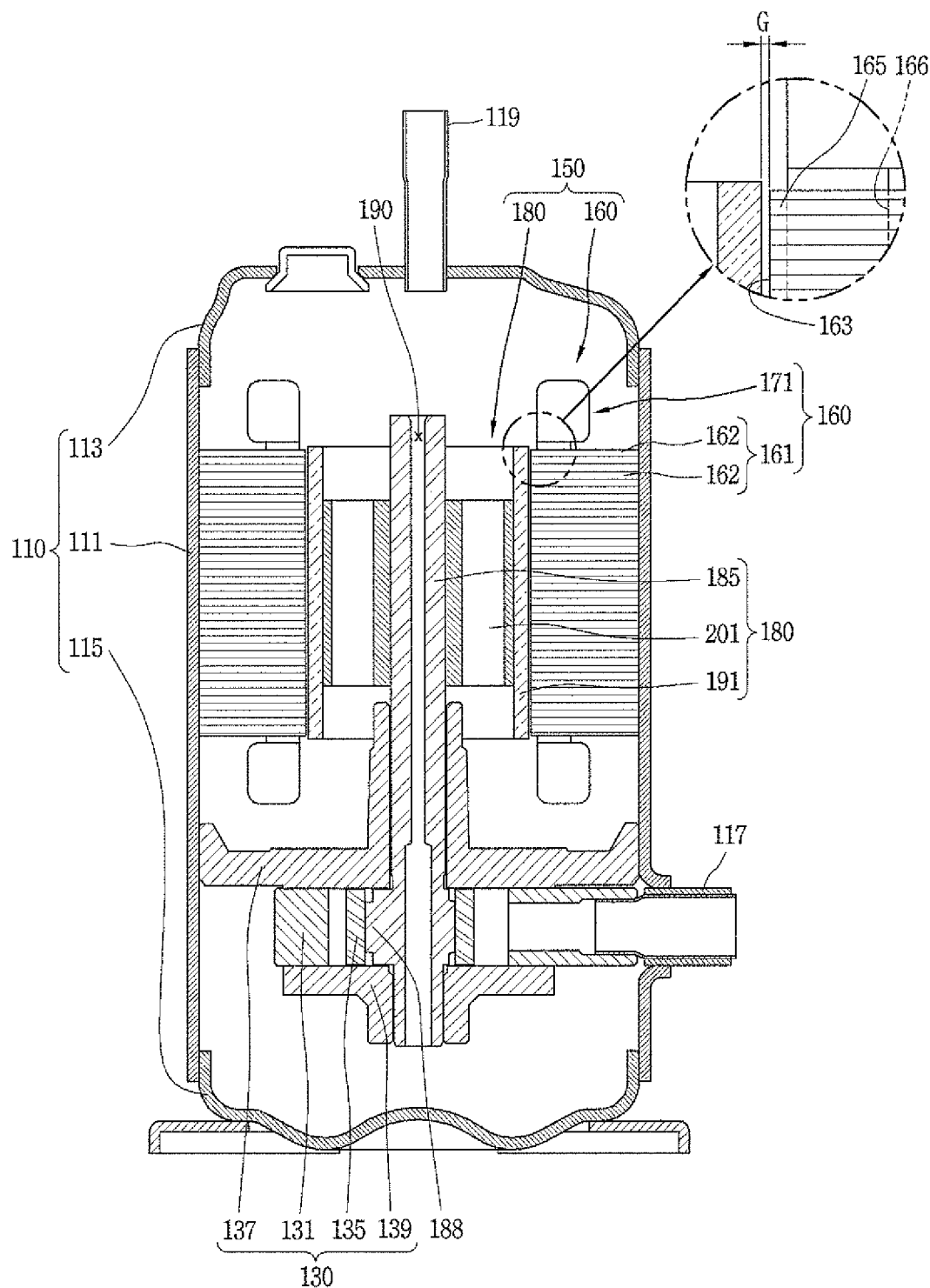
FIG. 1 is a cross-sectional view of a compressor provided with a motor having a permanent magnet according to an embodiment.
Figure 2:
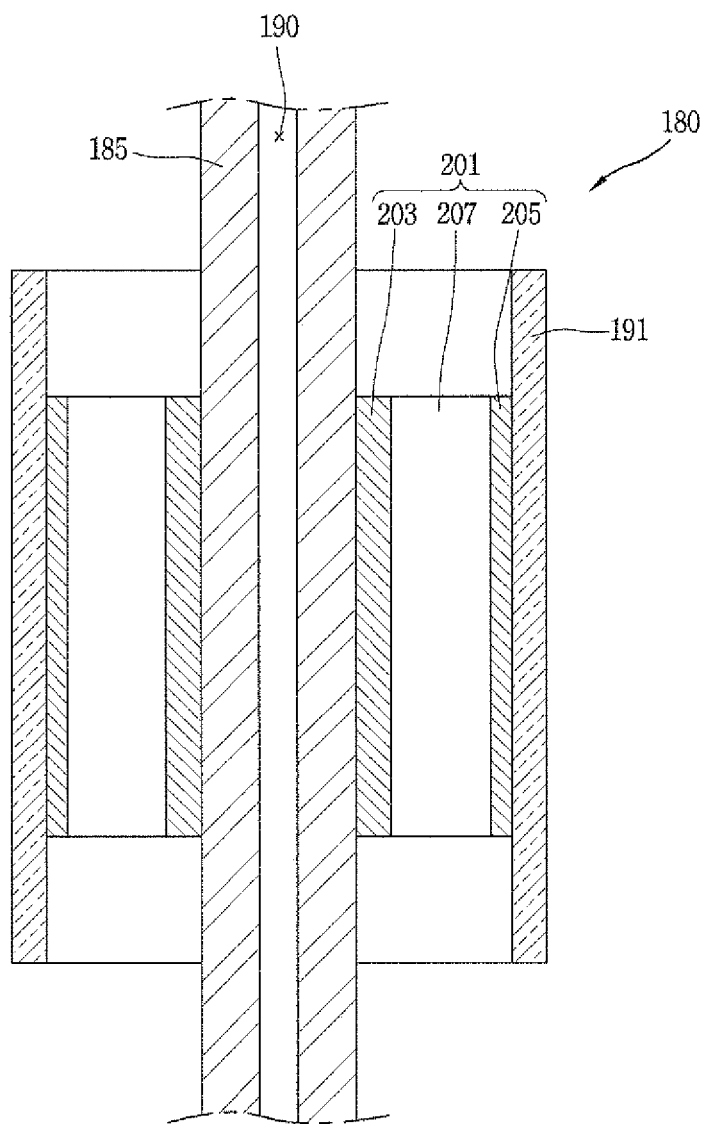
FIG. 2 is an enlarged view of the rotor of FIG. 1.
Figure 3:
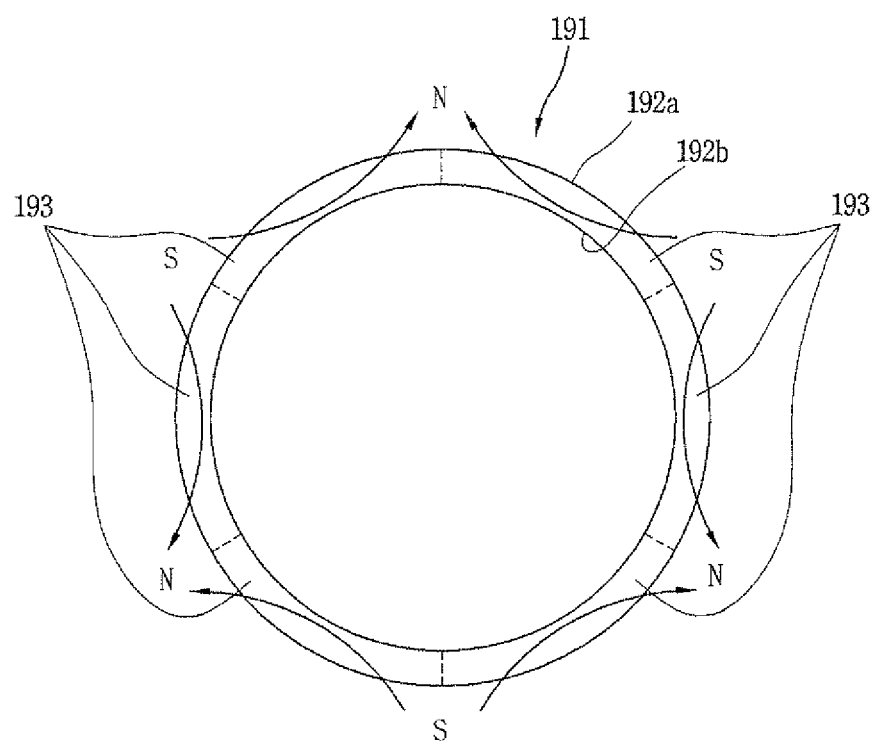
FIG. 3 is a view for describing magnetization of the permanent magnet of FIG. 2.

FIG. 1 is a cross-sectional view of a compressor provided with an electric motor having a permanent magnet according to an embodiment. FIG. 2 is an enlarged view of the rotor of FIG. 1. FIG. 3 is a view for describing magnetization of the permanent magnet of FIG. 2.

As shown in FIGS. 1 and 2, a compressor provided with an electric motor having a permanent magnet according to one embodiment includes a case 110; a compression unit 130 provided inside of the case 110 to compress refrigerant; and an electric motor 150 provided in the case 110 to supply a drive force to the compression unit 130 and having the permanent magnet according to an embodiment. For example, the case 110 may be configured to have a closed space therein. For example, the case 110 may include a cylindrical-shaped body 111, and a first cap 113 and a second cap 115 provided at both end portions (upper and lower portions in drawings) of the body 111, respectively.

An intake tube 117 may be provided at one side (side portion of the body 111 in drawings) of the case 110. The intake tube 117 may communicate with the compression unit 130. Accordingly, the refrigerant may flow into the compression unit 130.

A discharge tube 119 may be provided at the other side of the case 110 (the first cap 113 in drawings). Accordingly, the compressed refrigerant may be discharged from the case 110.

For example, the compression unit 130 may be provided at a lower region inside of the case 110. For example, the compression unit 130 may include a cylinder 131 in which a compression space is formed, a roller 135 rotated inside of the cylinder 131, and a main bearing 137 (upper bearing) and a sub bearing 139 (lower bearing) provided at both sides (upper and lower sides in drawings) of the cylinder 131.

For example, the main bearing 137 may block an upper side of the cylinder 131. The main bearing 137 may be expanded relative to the cylinder 131 to be supported fixedly inside the case 110.

For example, the sub bearing 139 may be formed so as to block a lower side of the cylinder 131. Bearing surfaces may be provided inside the main bearing 137 and the sub bearing 139 so as to rotatably support the rotational shaft 185, respectively.

An electric motor 150 having a permanent magnet (hereinafter referred to as "electric motor 150") according to one embodiment for providing a drive force to the compression unit 130 may be provided inside of the case 110. The electric motor 150 may include a stator 160; and a rotor 180 rotatably disposed about the rotational shaft 185 with a gap G from the stator 160.

The stator 160 may include a rotor accommodating hole 163 in which the rotor 180 is accommodated. The stator 160 may include a stator core 161 and a stator coil 171 wound around the stator core 161.

The stator core 161 may be formed by insulating and stacking a plurality of electric steel plates 162 having the rotor accommodating hole 163 at a center thereof. The stator core 161 may include a plurality of slots 165 and teeth 166 formed around the rotor accommodating holes 163.

The rotor 180 may include a rotational shaft 185; a permanent magnet 191 disposed concentrically with the rotational shaft 185; and a rotor frame 201 for supporting the permanent magnet 191. The rotational shaft 185 may be configured to have a long length to be connected to the rotor frame 201 at one or a first side or end thereof and to be connected to the roller 135 at the other or a second side or end thereof.

A through hole 190 passing through along an axial direction may be formed inside the rotational shaft 185.

An eccentric part or portion 188 may be formed at a region to which the roller 135 is coupled. The roller 135 may move eccentrically about the rotational shaft 185 inside the cylinder 131. Accordingly, the refrigerant flowing into the cylinder 131 may be compressed by eccentric rotational movement of the roller 135.

The permanent magnet 191 may be configured in a cylindrical shape. As shown in FIG. 3, the permanent magnet 191 may be magnetized in polar anisotropy such that a magnetic field is formed on a surface 192a (an outer surface 192a in drawings) facing the gap G and a magnetic field is not formed on a surface 192b (an inner surface 192b in drawings) opposite to the gap G. Accordingly, a magnetic field is formed at an outer side of the permanent magnet 191, and a magnetic field is not formed at an inner side of the permanent magnet 191.

The permanent magnet 191 may include a plurality of magnetic pole portions or poles 193 at which different poles (N poles, S poles) are disposed alternately along a circumferential direction. According to such a configuration, as the rotor frame 201 provided at the inner side of the permanent magnet 191 does not form a flux path of the permanent magnet 191, and restriction on a material, a shape, and a size of the rotor frame 201 is small, the rotor frame 201 may be formed more freely. Accordingly, the rotor frame 201 may be manufactured easily.

The rotor frame 201 may be configured to have a shortened length as compared with the permanent magnet 191 in the axial direction. Accordingly, the mass of the rotor frame 201 may be reduced.

For example, the rotor frame 201 may be formed to be reduced from both end portions to the inner side of the permanent magnet 191, respectively. Accordingly, as an empty space is formed between the permanent magnet 191 and the rotor frame 201 without any additional processing, the end portion of the main bearing 137 (upper end portion in drawings) may be inserted easily. Accordingly, unlike the related art in which a bearing insert portion is formed at the rotor frame, as the bearing insert portion is not formed, the rotor 180 may be manufactured easily.

Figure 4:
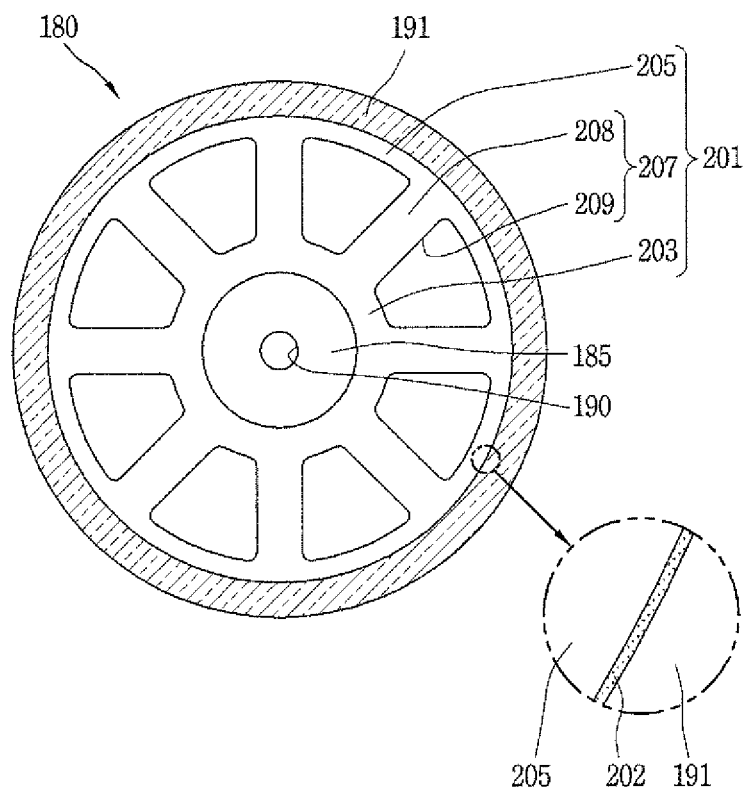
FIG. 4 is a plan view of the rotor of FIG. 2.
Figure 5:
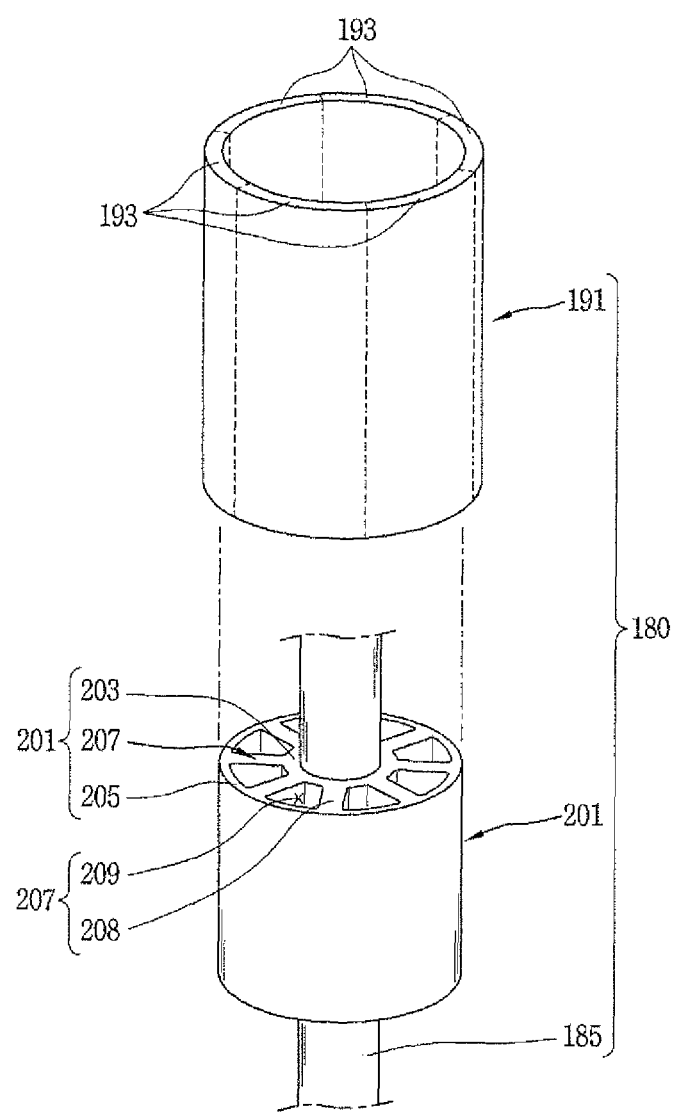
FIG. 5 is a view illustrating a state before the permanent magnet and the rotor frame of FIG. 2 are coupled.

FIG. 4 is a plan view of the rotor of FIG. 2. FIG. 5 is a view illustrating a state before the permanent magnet and the rotor frame of the rotor of FIG. 2 are coupled.

As shown in FIG. 4, the rotor frame 201 may include a hub 203 having the rotational shaft 185 therein, a cylindrical part or portion 205 disposed concentrically with the hub 203 at an outer side of the hub 203, and a connecting part or portion 207 connecting the hub 203 and the cylindrical part 205. For example, the rotor frame 201 may be formed of the same material as that of the rotational shaft 185.

The rotor frame 201 and the rotational shaft 185 may be manufactured separately from each other to be integrally coupled to each other. For example, the rotor frame 201 and the rotational shaft 185 may be simultaneously manufactured integrally by casting. For example, the hub 203 may protrude from an outer diameter surface of the rotational shaft 185 by a predetermined thickness, and may be extended to have a predetermined length in the axial direction.

Referring to FIG. 2, a case in which the hub 203, the connecting part 207, and the cylindrical part 205 are realized to have the same length in the axial direction is illustrated, but this is merely an example, and the hub 203, the connecting part 207, and the cylindrical part 205 may be configured to have different lengths in the axial direction. For example, the length in the axial direction of the connecting part 207 or the hub 203 may be formed to be smaller than that of the cylindrical part 205.

For example, the connecting part 207 may be formed to protrude from an outer surface of the hub 203 in a radial direction to be connected to an inner surface of the cylindrical part 205. For example, the connecting part 207 may include spokes 208 having a predetermined width along the circumferential direction to be spaced apart from each other at a predetermined distance along the circumferential direction.

For example, the connecting part 207 may include a penetration portion 209 formed between the spokes 208. Accordingly, the mass of the rotor frame 201 may be reduced. For example, the penetration portion 209 may have a fan shape. For example, the penetration portion 209 may be formed in a circular shape, an elliptical shape, and other polygonal shapes.

For example, the permanent magnet 191 may be realized as a sintered magnet formed by sintering. The permanent magnet 191 realized as the sintered magnet may be bonded to the rotor frame 201 by an adhesive 202.

For example, the permanent magnet 191 and the rotor frame 201 may be inserted and coupled in the axial direction as shown in FIG. 5. The adhesive 202 may be provided at mutual contact surfaces of the permanent magnet 191 and the rotor frame 201. According to such a configuration, the rotational shaft 185, the rotor frame 201, and the permanent magnet 191 may be formed respectively, and the roller 135 may be coupled to the eccentric part 188 of the rotational shaft 185 of the rotor 180.

The roller 135 may be coupled to the inside of the cylinder 131 and the main bearing 137 and the sub bearing 139 may be coupled to the upper side and the lower side of the cylinder 131 respectively. The adhesive 202 may be applied to at least one surface of the mutual contact surfaces of the rotor frame 201 and the permanent magnet 191, and the permanent magnet 191 and the rotor frame 201 may be inserted and coupled in the axial direction.

The rotor frame 201 may be disposed at an upper end of the rotational shaft 185, and the rotor frame 201 and the rotational shaft 185 may be moved relative to each other in the axial direction to couple to the rotor frame 201 and the rotational shaft 185. The rotor frame 201 may include a shortened length as compared with the permanent magnet 191 in the axial direction, so that one region of an upper end of the main bearing 137 may be inserted into an empty space between the permanent magnet 191 and the rotor frame 201.

When operation is started and power is applied to the stator 160, the rotor 180 may be rotated around the rotational shaft 185. The rotor 180 may be formed to reduce the mass of the rotor frame 201 to suppress occurrence of vibration and noise. In addition, the occurrence of vibration of the rotor 180 may be reduced, and wear of the main bearing 137 may be suppressed remarkably.

Hereinafter, another embodiment will be described with reference to FIGS. 6 to 14.

Figure 6:
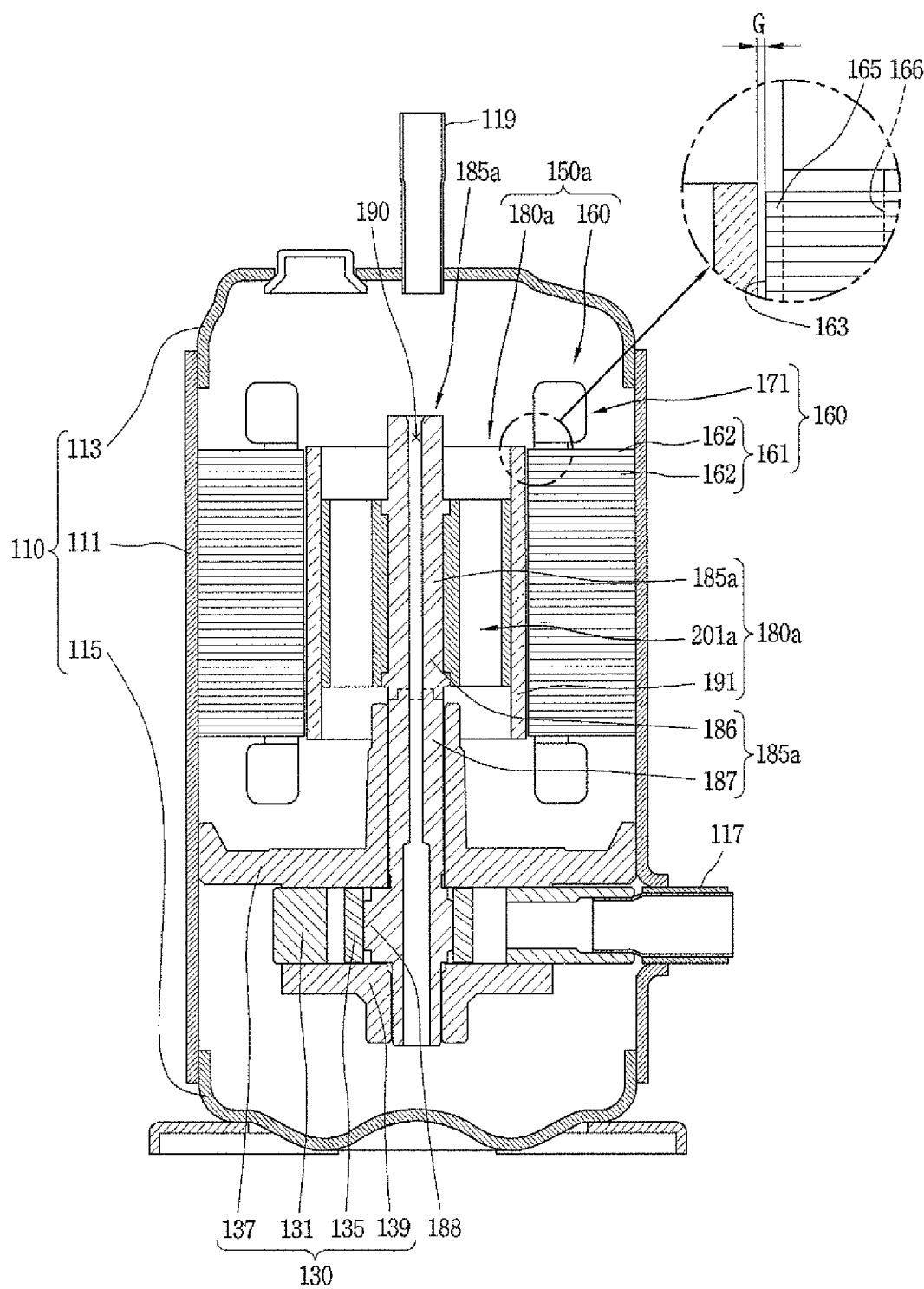
FIG. 6 is a cross-sectional view of a compressor provided with an electric motor having a permanent magnet according to another embodiment.
Figure 7:
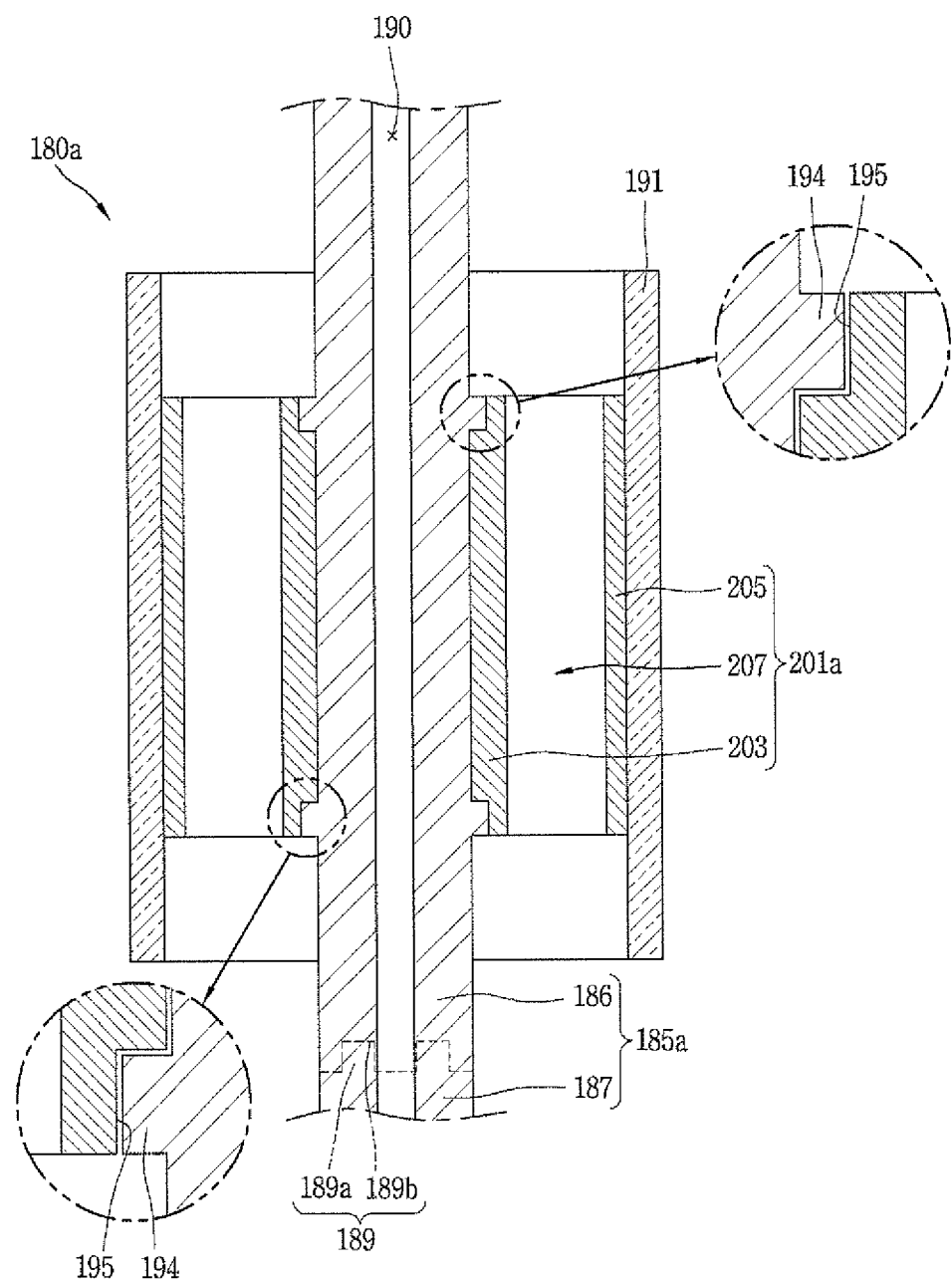
FIG. 7 is an enlarged view of the rotor of FIG. 6.
Figure 8:
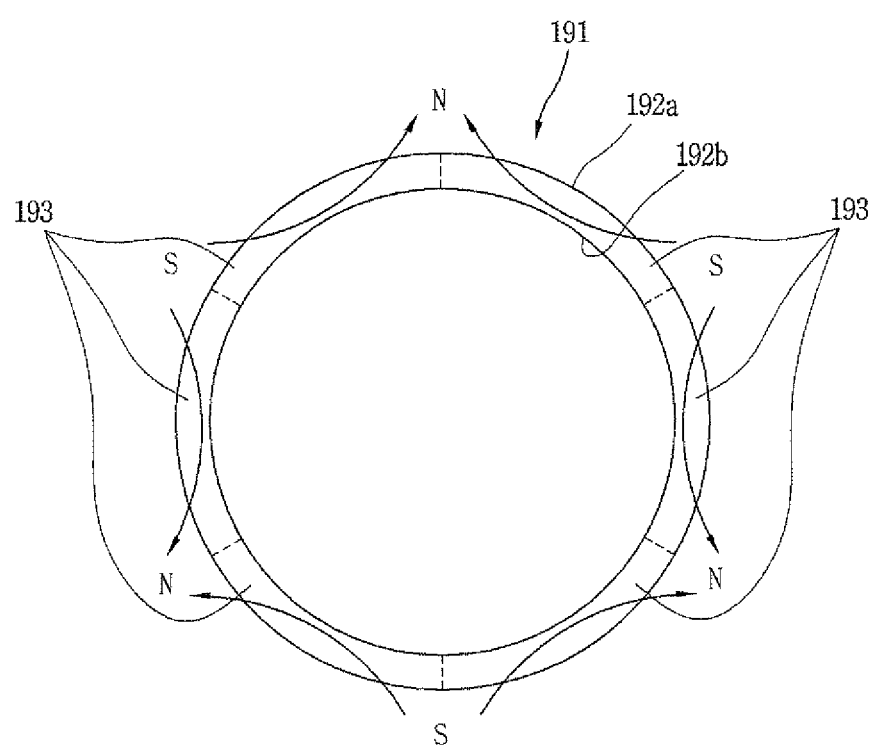
FIG. 8 is a view for describing magnetization of the permanent magnet of FIG. 7.

FIG. 6 is a cross-sectional view of a compressor provided with an electric motor having a permanent magnet according to another embodiment. FIG. 7 is an enlarged view of the rotor of FIG. 6. FIG. 8 is a view for describing magnetization of the permanent magnet of FIG. 7.

As shown in FIGS. 6 and 7, the compressor provided with the electric motor having the permanent magnet includes case 110; compression unit 130 installed in the case 110 to compress refrigerant; and electric motor 150a provided in the case 110 to provide a drive force to the compression unit 130 and having the permanent magnet according to an embodiment. The case 110 may include body 111, and first cap 113 and second cap 115 provided at both end portions of the body 111. Intake tube 117 and discharge tube 119 may be provided at the case 110, respectively.

The compression unit 130 may include cylinder 131, roller 135 provided in the cylinder 131, and main bearing 137 and sub bearing 139 provided at both sides of the cylinder 131.

The electric motor 150a having the permanent magnet (hereinafter referred to as "electric motor 150a") according to this embodiment may include stator 160; and rotor 180a rotatably disposed with a predetermined gap G with respect to the stator 160, and the rotor 180a may include rotational shaft 185a; permanent magnet 191 disposed concentrically with the rotational shaft 185a; and rotor frame 201a provided between the rotational shaft 185a and the permanent magnet 191. For example, the stator 160 may include stator core 161 and stator coil 171 wound around the stator core 161.

The stator core 161 may be formed, for example, by insulating and stacking a plurality of electric steel plates 162 having rotor accommodating hole 163 therein. A plurality of slots 165 and teeth 166 may be provided around the rotor accommodating hole 163.

The rotor 180a may include rotational shaft 185a, permanent magnet 191, and rotor frame 201a. For example, the rotational shaft 185a may include a first shaft portion 186 and a second shaft portion 187 which are coupled to each other in the axial direction.

The rotor frame 201a may be coupled to the first shaft portion 186. The roller 135 may be coupled to the second shaft portion 187. Accordingly, the rotational shaft 185a and the rotor frame 201a may be coupled to each other easily, and the rotational shaft 185a and the roller 135 may be coupled to each other easily.

For example, the first shaft portion 186 and the second shaft portion 187 may be configured to have a concave-convex portion 189 which is movable in the axial direction and engaged to be restricted in the rotational direction. For example, the concave-convex portion 189 may include a protrusion 189a protruding from the first shaft portion 186 and the second shaft portion 187 in the axial direction, respectively, and a protrusion groove 189b recessed to accommodate the protrusion 189a. The rotational shaft 185a may include through hole 190 penetrating therein in the axial direction.

The permanent magnet 191 may have a cylindrical shape. As shown in FIG. 8, the permanent magnet 191 is magnetized in polar anisotropy such that a magnetic field is formed on surface 192a (an outer surface in drawings) facing the gap G and is not formed on surface 192b (an inner surface in drawings) opposite to the gap. Accordingly, as a magnetic field is formed at an outer side of the permanent magnet 191, a magnetic field is not formed at an inner side of the permanent magnet 191, and the rotor frame 201a disposed at the inner side of the permanent magnet 191 is not constrained to the magnetic field, formation (manufacturing) thereof may be made more freely. The permanent magnet 191 may be provided with a plurality of magnetic pole portions 193 at which different poles (N poles, S poles) are disposed alternately along a circumferential direction.

Figure 9:
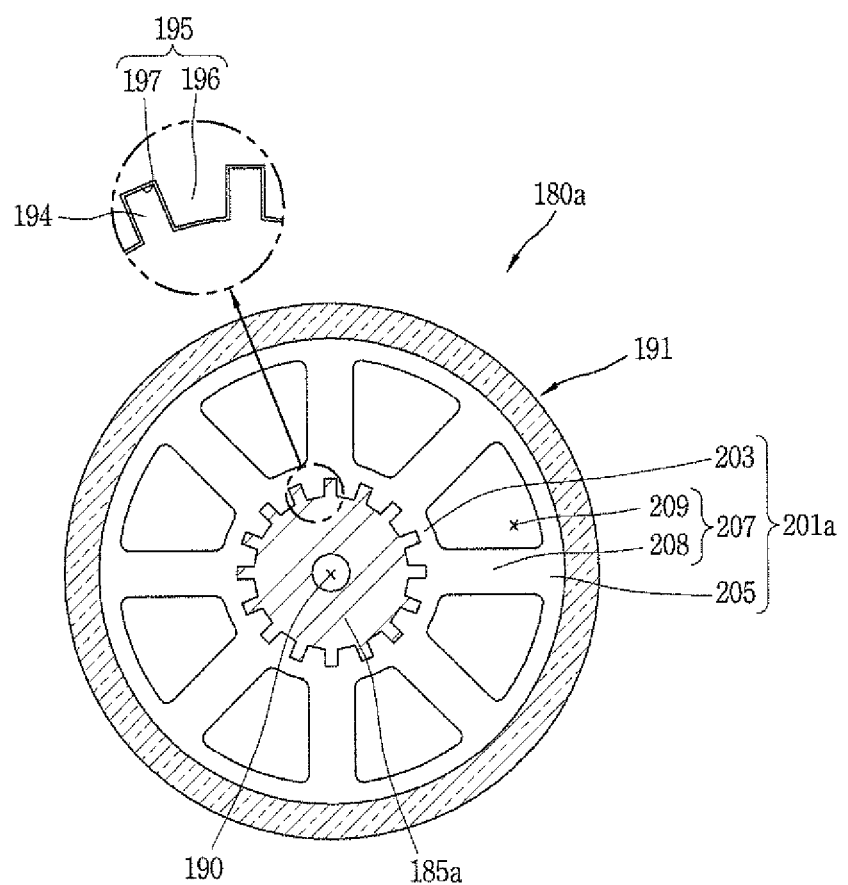
FIG. 9 is a plan view of the rotor of FIG. 7.
Figure 10:
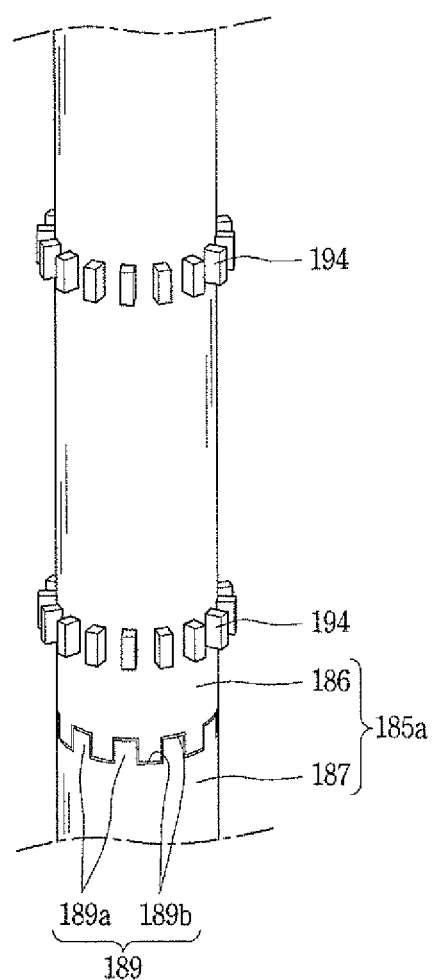
FIG. 10 is a perspective view of a main part of the rotational shaft of FIG. 9.
Figure 11:
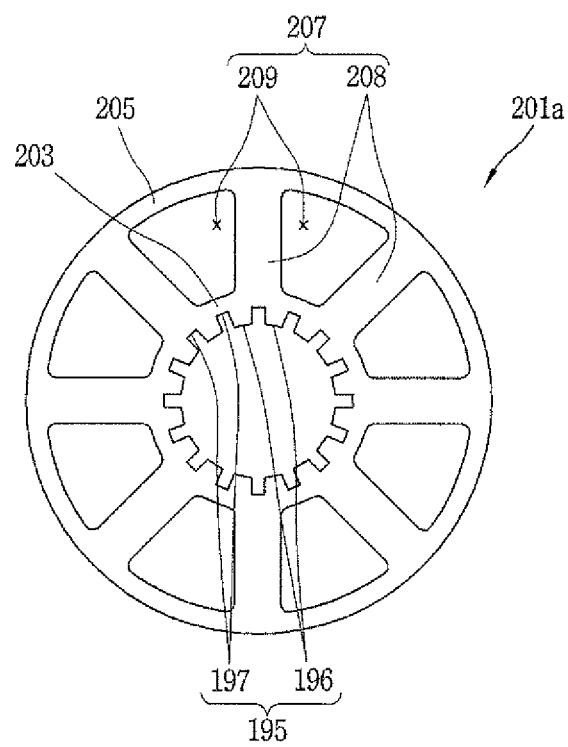
FIG. 11 is a plan view of the rotor frame of FIG. 9.

FIG. 9 is a plan view of the rotor of FIG. 7. FIG. 10 is a perspective view of a main part of the rotational shaft of FIG. 9. FIG. 11 is a plan view of the rotor frame of FIG. 9.

As shown in FIG. 9, the rotor frame 201a may include hub 203 having the rotational shaft 185a therein, a cylindrical part or portion 205 disposed concentrically with the hub 203 at an outer side of the hub 203, and a connecting part or portion 207 connecting the hub 203 and the cylindrical part 205. For example, the rotor frame 201a may be formed of a non-magnetic member of a lightweight material. For example, the rotor frame 201a may be formed of a synthetic resin member (plastic).

For example, the connecting part 207 may include a plurality of spokes 208 connecting the hub 203 and the cylindrical part 205, and a penetration portion 209 formed to pass through between the spokes 208. For example, as shown in FIG. 10, the rotational shaft 185a may include a protrusion 194 protruding at an outer surface in the radial direction.

The protrusion 194 may be formed to be spaced apart from each other along the circumferential direction of the rotational shaft 185a. The protrusion 194 may be disposed to be spaced apart from each other along the axial direction of the rotational shaft 185a. The protrusion 194 may be formed to be spaced apart to correspond to both end portions of the rotor frame 201a.

For example, the rotor frame 201a may be formed by injection molding around the rotational shaft 185a. For example, as shown in FIG. 11, the rotor frame 201a may be provided with an engaging portion 195 engaging with the protrusion 194 in the rotational direction (circumferential direction).

For example, the engaging portion 195 may include a protrusion portion 196 inserted between the protrusions 194, and a groove portion 197 into which the protrusion 194 is inserted.

For example, the rotor frame 201a may be configured to have a shortened (reduced) length in the axial direction compared with that of the permanent magnet 191. Accordingly, the mass of the rotor frame 201a may be reduced remarkably.

Accordingly, the mass of the rotor 180a may be reduced, and occurrence of vibration and noise due to vibration may be reduced.

Figure 12:
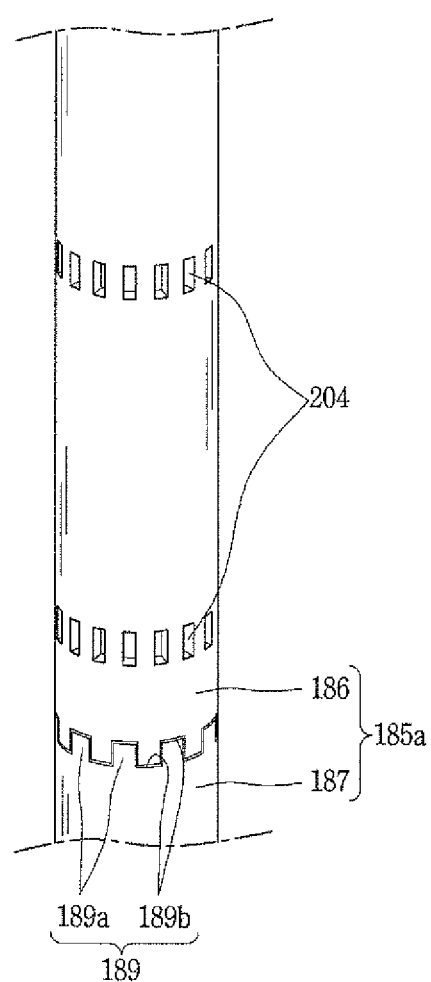
FIG. 12 illustrates a modified example of the rotational shaft of FIG. 9.
Figure 13:
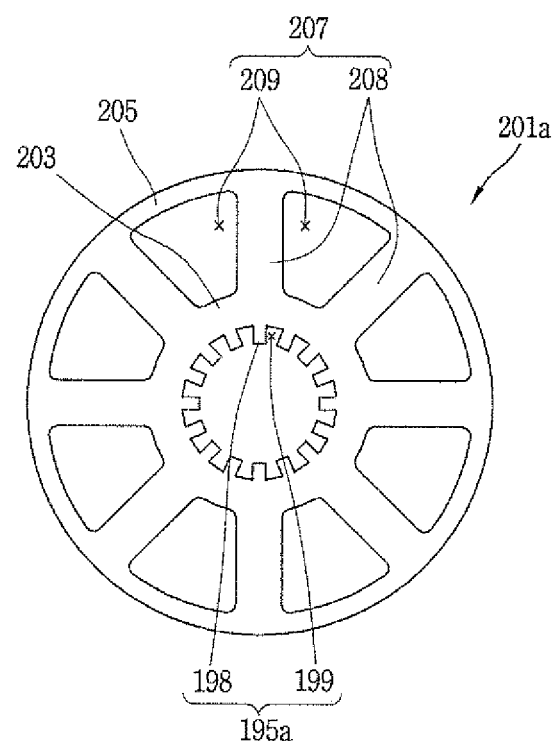
FIG. 13 is a plan view of a modified example of the rotor frame of FIG. 10.

FIG. 12 illustrates a modified example of the rotational shaft of FIG. 9. FIG. 13 is a plan view of a modified example of the rotor frame of FIG. 10.

As shown in FIG. 12, the rotational shaft 185a may be configured to have a groove 204 recessed inwardly along the radial direction. The grooves 204 may be formed to be spaced apart from each other along the circumferential direction of the rotational shaft 185a. The grooves 204 may be formed to be spaced apart from each other along the axial direction of the rotational shaft 185a.

As shown in FIG. 13, the rotor frame 201a may be provided with engaging portion 195a engaging with the groove 204 along the rotational direction. For example, the engaging portion 195a may be configured to have insert portion 198 inserted into the groove 204 and contact portion 199 contacting an outer surface of the rotational shaft 185a.

For example, the permanent magnet 191 may be composed of a sintered magnet formed by sintering by pressurizing and heating magnetic substance powder. The permanent magnet 191 may be bonded to an outer surface of the rotor frame 201a by adhesive 202.

Figure 14:
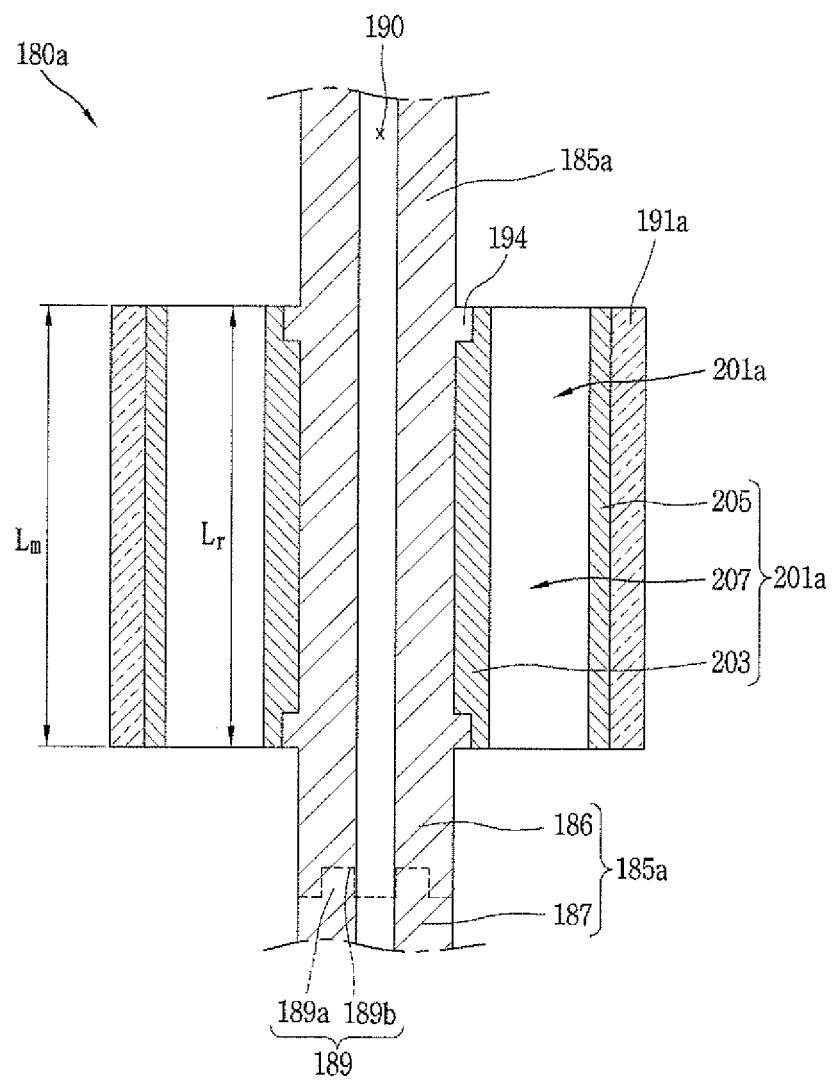
FIG. 14 is a cross-sectional view of a rotor illustrating a modified example of the permanent magnet of FIG. 7.

For example, the permanent magnet 191 may be composed of a bonded magnet obtained by solidifying the magnetic substance powder with a synthetic resin (plastic). For example, as shown in FIG. 14, the permanent magnet 191a may be configured to have a length Lm in the axial direction equal to a length Lr in the axial direction of the rotor frame 201a.

After the rotational shaft 185a and the rotor frame 201a are injection-molded, the permanent magnet 191a may be manufactured by injection molding at the outer surface of the rotor frame 201a. According to such a configuration, the rotor frame 201a may be formed integrally around the protrusion 194 of the rotational shaft 185a (the first shaft portion 186) by injection.

The permanent magnet 191 may be coupled integrally to the outer surface of the rotor frame 201a by the adhesive 202, or the permanent magnet 191 may be formed integrally by injection. The roller 135 may be coupled around the rotational shaft 185a (the second shaft portion 187).

The main bearing 137 and the sub bearing 139 may be coupled to the rotational shaft 185a (the second shaft portion 187). The first shaft portion 186 provided with the rotor frame 201a and the second shaft portion 187 coupled to the roller 135 and the main bearing 137 may be coupled integrally to each other so that the concave-convex portion 189 is engaged along the axial direction. The concave-convex portion 189 may be integrally coupled to each other by welding or bonding.

When the operation is started and power is applied to the stator coil 171, the rotor 180a may be rotated about the rotational shaft 185a. As the rotor 180a of this embodiment includes the rotor frame 201a of a lightweight material, the total mass is reduced, thereby suppressing generation of vibration and noise. The rotor frame 201a and the rotational shaft 185a may be prevented from slipping in the rotation direction by the protrusion 194 and the engaging portion 195.

In the embodiments related to FIGS. 1 to 5, a case in which the electric motor having the permanent magnet is configured to drive the compression unit is illustrated, but it goes without saying that the electric motor having the permanent magnet may be configured as an electric motor having a separate motor case.

The foregoing description has been given of specific embodiments. However, embodiments may be embodied in various forms without departing from the spirit or essential characteristics thereof, and thus, the above-described embodiments should not be limited by the details of the detailed description.

In addition, even embodiments not listed in the detailed description should be interpreted within the scope of the technical idea defined in the appended claims. It is intended that the embodiments cover the modifications and variations provided they come within the scope of the appended claims and their equivalents.

Embodiments disclosed herein may be utilized in various industrial fields where an electric motor having a rotor and a stator and a compressor including the same are manufactured and used.

The invention claimed is:

1. An electric motor having a permanent magnet, comprising:
   a stator; and
   a rotor rotatably disposed and spaced a predetermined gap apart from the stator, wherein the rotor includes:
      a rotational shaft;
      a permanent magnet disposed concentrically with the rotational shaft; and
      a rotor frame provided between the rotational shaft and the permanent magnet, wherein the permanent magnet has a cylindrical shape and is magnetized in polar anisotropy such that a magnetic field is formed on a surface of the permanent magnet facing the gap and a magnetic field is not formed on a surface of the permanent magnet opposite to the gap, wherein the rotor frame does not form a flux path of the permanent magnet and is configured to connect the rotational shaft and the permanent magnet, wherein the rotational shaft and the rotor frame are formed of the same material, wherein the rotor frame is formed integrally so as to protrude from an outer surface of the rotational shaft along a radial direction, wherein the rotor frame includes a hub configured to receive the rotational shaft therein, a cylindrical portion disposed concentrically with the hub at an outer side of the hub, and a connecting portion that connects the hub and the cylindrical portion, and wherein the rotor frame and the rotational shaft are manufactured integrally by casting.

2. The electric motor of claim 1, wherein the permanent magnet is a sintered magnet, and an adhesive layer is provided between the permanent magnet and the rotor frame.

3. The electric motor of claim 2, wherein the rotor frame is formed to have a reduced length as compared with the permanent magnet along an axial direction.

4. The electric motor of claim 1, wherein the permanent magnet is a bonded magnet, and the permanent magnet is injection-molded at an outer surface of the rotor frame.

5. A compressor, comprising:
a case;
a compression unit provided inside of the case to compress a fluid; and
the electric motor of claim 1 provided inside of the case and providing a drive force to the compression unit.

6. The compressor of claim 5, wherein the compression unit includes:
a cylinder forming a compression space;
a roller connected to the rotational shaft of the electric motor and rotated inside of the cylinder; and
a bearing provided at the cylinder to rotatably support the rotational shaft.

7. The compressor of claim 6, wherein the rotational shaft includes a first shaft coupled to the rotor frame and a second shaft coupled to the roller, wherein the first shaft and the second shaft are coupled integrally to each other after the rotor frame and the roller are coupled.

8. The electric motor of claim 7, wherein the first shaft and the second shaft are configured to have a concave-convex portion which is movable in an axial direction and engaged to be restricted in a rotational direction.

9. The electric motor of claim 8, wherein the concave-convex portion includes a protrusion that protrudes from the first shaft and the second shaft in the axial direction, respectively, and a protrusion groove that is recessed to accommodate the protrusion.

10. The electric motor of claim 5, further comprising an intake tube provided at a first side of the case, wherein the intake tube communicates with the compression unit, and wherein the fluid flows into the compression unit through the intake tube.

11. The electric motor of claim 10, further comprising a discharge tube provided at a second side of the case, wherein a compressed fluid compressed in the compression unit is discharged from the case.

12. The electric motor of claim 1, wherein the connecting portion includes a plurality of spokes and a plurality of penetration portions formed between the respective plurality of spokes.

13. The electric motor of claim 12, wherein the plurality of spokes is spaced apart from each other at a predetermined distance along a circumferential direction having a predetermined width.

14. The electric motor of claim 12, wherein the plurality of penetration portions is formed in one of a circular shape, an elliptical shape, or a polygonal shape.

15. The electric motor of claim 1, wherein the rotational shaft includes a through hole penetratingly formed in an axial direction of the rotational shaft.

16. An electric motor having a permanent magnet, comprising:
a stator; and
a rotor rotatably disposed and spaced a predetermined gap apart from the stator, wherein the rotor includes:
a rotational shaft that extends in an axial direction;
a cylindrical permanent magnet disposed concentrically with the rotational shaft; and
a rotor frame that connects the rotational shaft and the permanent magnet, wherein the permanent magnet is magnetized such that a magnetic field is formed on a surface of the permanent magnet facing the gap and a magnetic field is not formed on a surface of the permanent magnet opposite to the gap, wherein the rotor frame is shorter in length along the axial direction than the permanent magnet, wherein the rotational shaft and the rotor frame are formed of the same material, wherein the rotor frame is formed integrally so as to protrude from an outer surface of the rotational shaft along a radial direction, wherein the rotor frame includes a hub configured to receive the rotational shaft therein, a cylindrical portion disposed concentrically with the hub at an outer side of the hub, and a connecting portion that connects the hub and the cylindrical portion, and wherein the rotor frame and the rotational shaft are manufactured integrally by casting.

17. The electric motor of claim 16, wherein the permanent magnet is a sintered magnet, and an adhesive layer is provided between the permanent magnet and the rotor frame.

18. The electric motor of claim 16, wherein the permanent magnet is a bonded magnet, and the permanent magnet is injection-molded at an outer surface of the rotor frame.

19. A compressor, comprising:
a case;
a compression unit provided inside of the case to compress a fluid; and
the electric motor of claim 16 provided inside of the case and providing a drive force to the compression unit, wherein the compression unit includes:
a cylinder forming a compression space;
a roller connected to the rotational shaft of the electric motor and rotated inside of the cylinder; and
a bearing provided at the cylinder to rotatably support the rotational shaft.

* * * * *